July 9, 1929.  A. KERNS  1,720,128

CYLINDER PISTON PACKING RING

Filed Oct. 27, 1927

Inventor:
ARTHUR KERNS
BY *Monroe E. Miller*
Attorney

Patented July 9, 1929.

1,720,128

UNITED STATES PATENT OFFICE.

ARTHUR KERNS, OF BALTIMORE, MARYLAND.

CYLINDER PISTON PACKING RING.

Application filed October 27, 1927. Serial No. 229,093.

This invention pertains to pistons and packing rings. Among the objects thereof are to produce a piston packing ring having a large wearing area, great flexibility, an even distribution of expanding and contracting qualities.

It consists generally of two thin concentric rings, one fitting over the other and each provided with an integral rib that extends outward from the inner ring and inward from the outer one; and a novel assembly in which cylindrical rings expand and contract within and without each other in relation to the bore of the cylinder.

Figure 1:
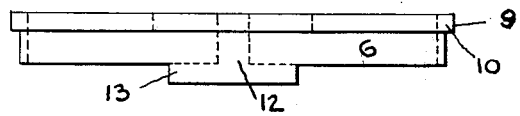
Figure 2:
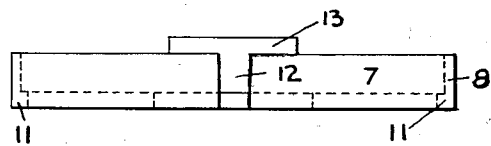
Figure 3:
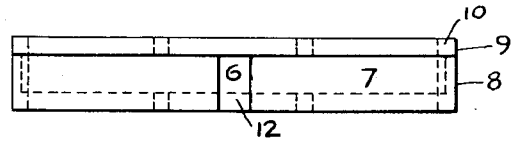
Figure 4:
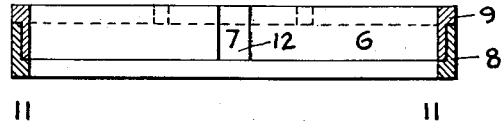
Figure 5:
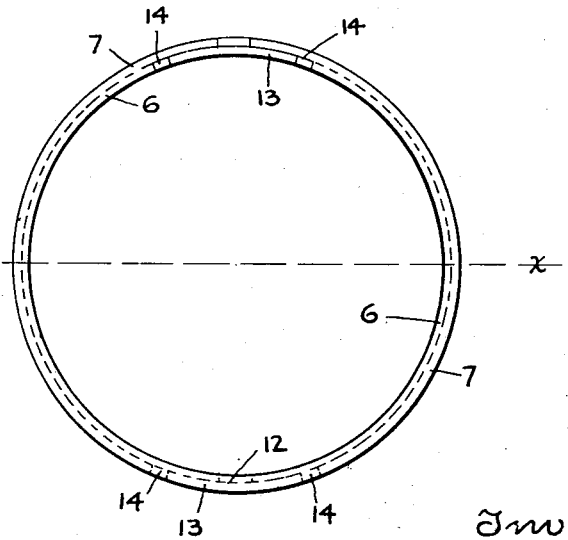

In the drawings, which are for illustrative purposes only and in no manner to limit the invention or scope of the claim, Fig. 1 is a side view of the inner ring; Fig. 2 a side view of the outer ring; Fig. 3 a side view of the assembled rings; Fig. 4 a sectional view on line X—X of Figure 5, and Fig. 5 a plan view of the two rings assembled.

Like numerals refer to like parts through the several views.

The packing consists of two cylindrical rings 6—7, one fitting over the other and having the respective surfaces 8—9, bearing against the cylinder bore by which each ring is actively engaged with the bore or wearing surface of the cylinder.

The above is made possible by a rib 10 projecting outward from the inner ring 6 and flush with the face of the outer ring 7.

The outer ring also having a rib 11 projecting inward, provides both rings with means to stiffen the body of the rings, by which snappiness and stiffness is imparted to the more elastic portions. By this formation, when the rings are assembled into the ring proper, there is afforded greater elasticity than if the metal involved in both rings was integral, also a more even distribution of expansion and contraction similar to a laminated leaf spring.

Each ring has a split 12 and a diametrically opposite projection 13 that fits in the space 14 cut away from the rib of the other ring. This formation creates an over-lapping joint and produces a complete cut off to the passage of fluid from one side of the ring to the other across the surface of the ring working against the cylinder bore.

It will be noted that each ring or section has a rib at one edge thereof overlapping the corresponding edge of the other ring, and that the ends of the ribs terminate short of the splits, with the extension of each ring at the edge thereof opposite to the rib of such ring and disposed between the ends of the rib of the other ring. The two rings or sections thus complement one another.

In the operation, when the ring is assembled and in position in the cylinder, both surfaces 8—9 bear at right angles against the bore and both rings 6—7 diametrically bear against each other and press the surfaces 8—9 against the cylinder with a complementary action, that permits great elasticity and likewise contraction and expansion that responds to the changing requirements and thereby produces a tight joint without any excess of pressure or friction between the working parts, resulting in a uniform acting packing of great reliability and simple construction, which is not liable to "let go," stick or get out of order.

While I have shown and described the preferred form of my invention, I include all modifications and equivalents within the spirit of the invention as within the scope of the claim.

Having described my invention, I claim:

A piston packing comprising outer and inner rings each having a rib at one edge overlapping the corresponding edge of the other ring, each ring being split at one point, the ends of said ribs terminating short of said splits, and each ring having an extension at its opposite edge disposed between the ends of the rib of the other ring.

In testimony whereof I affix my signature.

ARTHUR KERNS.